United States Patent
Derr (10) Patent No.: US 7,694,004 B2
(45) Date of Patent: Apr. 6, 2010

(54) BIT-GRANULAR WRITES OF CONTROL REGISTERS

(75) Inventor: Michael N. Derr, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 1837 days.

(21) Appl. No.: 09/821,116

(22) Filed: Mar. 30, 2001

(65) Prior Publication Data

US 2002/0143967 A1    Oct. 3, 2002

(51) Int. Cl.
G06F 15/16 (2006.01)
G06F 12/00 (2006.01)

(52) U.S. Cl. .................................... 709/230; 709/250

(58) Field of Classification Search ................ 709/230, 709/250; 711/142–143, 155; 365/189.01, 365/195–196
See application file for complete search history.

(56) References Cited

U.S. PATENT DOCUMENTS

| | | | |
|---|---|---|---|
| 4,153,950 A * | 5/1979 | Nosowicz et al. ............ 365/231 |
| 4,215,756 A * | 8/1980 | Hunt ............................ 180/127 |
| 4,383,297 A * | 5/1983 | Wheatley et al. ................ 710/3 |
| 4,680,594 A * | 7/1987 | Bracht ...................... 369/53.36 |
| 4,691,299 A * | 9/1987 | Rivest et al. ........... 365/189.01 |
| 5,128,910 A * | 7/1992 | Iida ........................... 369/13.24 |
| 5,752,075 A * | 5/1998 | Kikinis ........................... 710/1 |
| 5,980,276 A * | 11/1999 | Arita et al. .................... 439/131 |
| 5,996,032 A * | 11/1999 | Baker .......................... 710/62 |
| 5,999,441 A * | 12/1999 | Runaldue et al. ............ 365/154 |
| 6,075,721 A * | 6/2000 | Runaldue et al. ............ 365/154 |
| 6,560,669 B1 * | 5/2003 | Ryan .......................... 711/105 |
| 6,567,953 B1 * | 5/2003 | Pomerantz ................... 714/805 |
| 6,598,157 B1 * | 7/2003 | McKee ........................... 713/1 |
| 6,704,808 B2 * | 3/2004 | Kasamatsu et al. ............. 710/2 |

* cited by examiner

Primary Examiner—Zarni Maung
(74) Attorney, Agent, or Firm—Caven & Aghevli LLC

(57) ABSTRACT

In an example embodiment, a method writes individual bits of data to a register. Bits of data are received in a data field. The number of bits in the data field is equal to the number of bits in the register and the bit locations in the data field correspond respectively to the bit locations in the register. Enable bits are received in a bit enable field. The number of enable bits in the bit enable field is equal to the number of bits in the register. The bit locations in the bit enable field correspond respectively to bit locations in the register. Only the bits at the bit locations of the register for which the enable bit in the corresponding location in the bit enable field is set are overwritten with the bit in the corresponding location in the data field.

22 Claims, 6 Drawing Sheets

| | BIT ENABLES | | | | REGISTER BITS | | | | COMMENTS |
|---|---|---|---|---|---|---|---|---|---|
| | 3 | 2 | 1 | 0 | 3 | 2 | 1 | 0 | |
| INITIAL VALUE | | | | | 0 | 0 | 1 | 1 | |
| SOFTWARE WRITE "1010_1X0XB" | 1 | 0 | 1 | 0 | 1 | X | 0 | X | BITS 3 AND 1 ARE ENABLED TO BE OVERWRITTEN |
| RESULTING VALUE | | | | | 1 | 0 | 0 | 1 | BITS 3 AND 1 ARE OVERWRITTEN, WHILE BITS 2 AND 0 RETAIN THEIR INITIAL VALUES |

FIG. 7

BIT-GRANULAR WRITES OF CONTROL REGISTERS

BACKGROUND

1. Field of the Invention

This invention relates generally to data transfer operations between computer devices. In particular, the invention relates to methods of writing data to registers which control data transfer operations between devices in a computer system.

2. Description of the Related Art

The host processor of a computer system fetches and executes instructions which may cause the host processor to transfer data between the memory, a central processing unit (CPU) and an arithmetic and logic unit (ALU) or to initiate input/output (I/O) data transfer operations with I/O devices or peripherals external to the host processor. The computer system typically includes at least one controller which acts as the communications intermediary between the processor and one or more I/O subsystems, which may each contain one or more external I/O devices or peripherals. As a result transfer operations may not be optimized, and the wait time for processing data transferred through the computer system may be unnecessarily lengthened. The controller may be contained in a bridge, such as an I/O Controller Hub (ICH) available from Intel Corporation of Santa Clara, Calif., provided to interface with and buffer transfers of data between various computer devices.

The advanced technology attachment standard, frequently written as AT attachment (ATA) or integrated drive electronics (IDE), is commonly used for power and data signal interface communications between a host processor and a storage device. This set of standards is produced by Technical Committee T13 (www.t13.com) of the National Committee on Information Technology Standards (www.NCITS.org), Washington, D.C. The AT Attachment Interface for Disk Drives (ANSI X3.221-199×) is a disk drive interface standard that specifies the logical characteristics of the interconnecting signals as well as the protocols and commands for the storage device operation. This standard permits compatibility between host system products and storage device products that comply with the standard, even where these products are produced by different manufacturers.

An IDE controller is conventionally located between any IDE storage device (such as a hard disk drive) and the host processor. It serves as a translator to facilitate C(PU/IDE device communications over each I/O cycle. For example, on receiving an initialization command from the host processor, the IDE interface controller presents the command into something the downstream IDE device will understand, i.e. that the IDE device can handle, and sends this command to the attached IDE device. On receiving the converted command, the IDE device processes the command and sends back a completion notification to the processor through the IDE interface controller. This conventional I/O cycle from command sent to completion notification is a single task-file register access that may take approximately 1.2 microseconds ($\mu s$—one millionth ($10^{-6}$) of a second).

Conventionally, the host processor dedicates a block of its processing time to the initialization of a peripheral, such as an IDE storage device. During this peripheral initialization dedication time, the host processor is prevented from performing other processing functions and thus its performance is slowed down. Furthermore, the performance of a bridge or a controller may be burdened by demands to access memory locations and control registers during data transfer operations. Conventional control registers usually offer only byte-level write control. Therefore, when software must write to a specific bit (or bits) of a byte in a control register, it must first read the byte, merge the bit (or bits) to be modified into the read byte, and then write the modified byte back to the register. See FIG. 3. For typical I/O and configuration registers, the processor is stalled approximately 1 microsecond (about 1,000 processor clocks) while performing this read-merge-write sequence (perhaps only to write a single bit). If the read-merge-write sequences are necessary for streamlining of the initialization command sequence, then they inherently prevent the sequence from being posted to the controller for the external I/O device or peripheral.

BRIEF DESCRIPTION OF THE DRAWINGS

A better understanding and appreciation of the foregoing and of the attendant advantages of the present invention will become apparent from the following detailed description of example embodiments of the invention. While the foregoing and following written and illustrated disclosure focuses on disclosing example embodiments of the invention, it should be clearly understood that the same is by way of illustration and example only and is not to be taken by way of limitation.

DETAILED DESCRIPTION

While example embodiments are described herein, the present invention is applicable for use with all types of computer systems, I/O controllers and devices, and chipsets, including any follow-up chip designs which link together such disparate computer devices as processors, peripherals, storage devices, and devices for data communications. For the sake of simplicity, discussions will concentrate mainly on a desktop personal computer having several I/O units interconnected to a host processor by an I/O controller hub (ICH), buses and interfaces, although the scope of the present invention is not limited thereto. A wide variety of implementations, arrangements and configurations of computer systems (e.g., processors, bridges and I/O units) may be possible.

Figure 1:
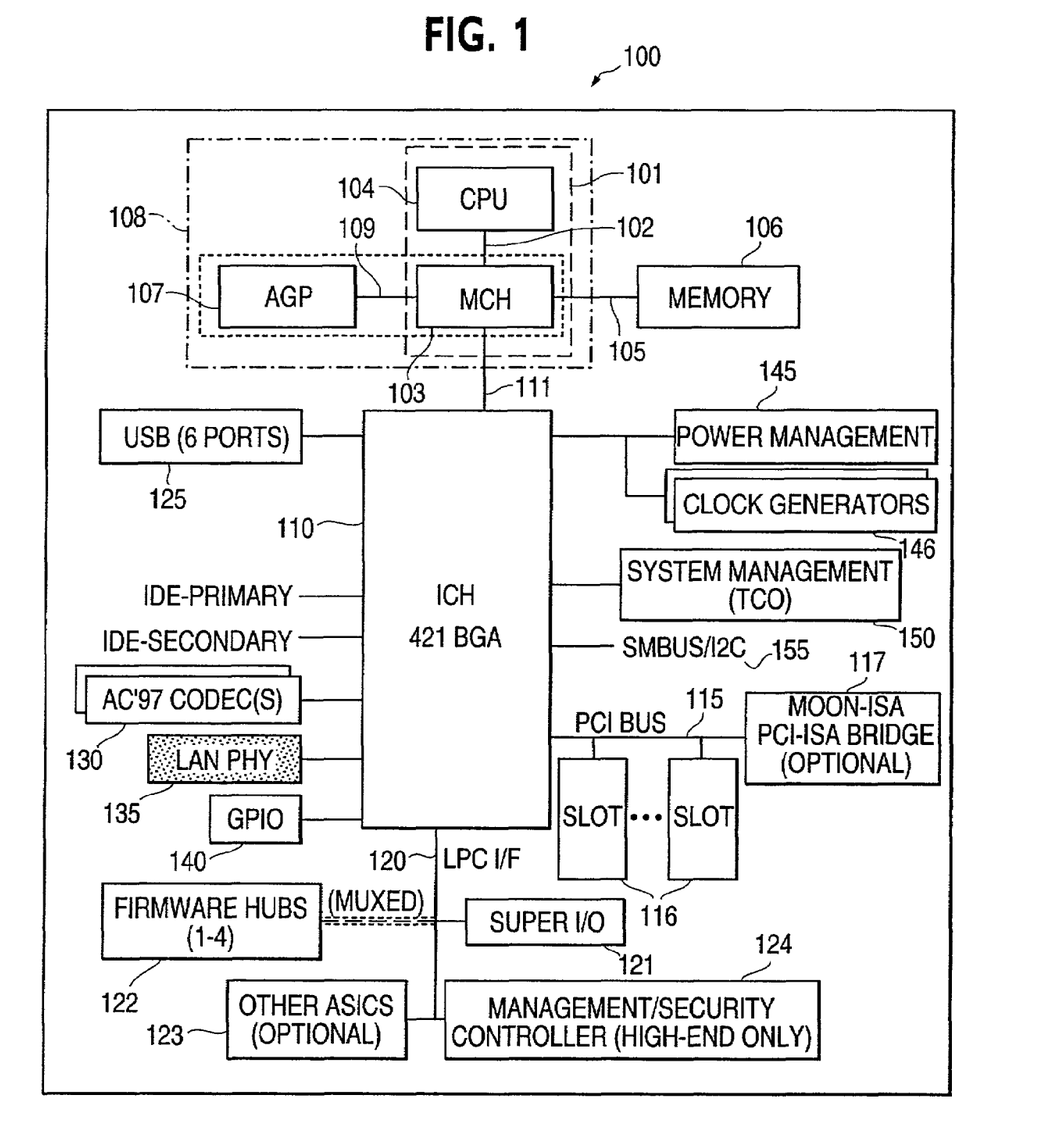
FIGS. 1 and 2 are a generalized block diagram of an exemplary computer system in which an example embodiment of the invention may be practiced.

The system diagram of an exemplary desktop personal computer 100 is shown in FIG. 1. Although desktop computer system 100 is shown in FIG. 1, the invention may be utilized with a wide range of processing systems having I/O data transfer operations such as, but not limited to, a mainframe computer, a server, a radio, a television, a set-top box, a mobile computer, such as a laptop, a satellite system, or other electronic device that processes information.

The desktop computer system 100 includes a host processor subsystem 101 which may be comprised of one or more host processors (which may have respective associated cache memories) and a memory controller hub (MCH) 103 connected to the processor(s) by a host processor front side bus 102. The host processor(s) may be, for example, any one of the Pentium® family of processors manufactured by the assignee of this application, Intel corp. of Santa Clara, Calif., but for the sake of simplicity the host processor(s) are represented and referred to merely as CPU 104. Regardless of the number of host processors in processor subsystem 101, a single processor may operate on a single item (such as I/O data transfer operation), and the plurality of processors may collectively operate on multiple items (I/O data transfer operations) on a list at the same time.

Memory subsystem 106 is connected to MCH 103 through at least one memory bus 105 and stores information and instructions for use by processor subsystem 101. It has at least one memory element, which is preferably a dynamic random-access-memory (DRAM), but may be substituted for by other types of memory. Memory subsystem 106 may include any storage device that works toward holding data in a machine-readable format.

The desktop computer system 100 may have a motherboard 108 as a main board of the computer system. Motherboard 108 may contain circuitry for a processor, a keyboard, and a monitor as well as include slots to accept additional circuitry. It may also have one or more buses, which may each be one of a set of conductors (wires, printed circuit board tracks or connections in an integrated circuit) connecting the various functional units on motherboard 108.

A graphics subsystem having the necessary video memory and other electronics to provide a bitmap display to a display device (such as a cathode ray tube monitor, liquid crystal display, or flat panel display) is included with, or attached to, motherboard 108, or with or to other components included with or attached to motherboard 108. The graphics subsystem may be an Advanced Graphics Port (AGP) video card 107 (including an AGP 4× graphics controller and a local memory on its own circuit board) connected to MCH 103 via an AGP 2.0 bus 109 as shown.

The operating system of desktop computer system 100 may include one or more device-specific drivers utilized to establish communication with I/O controllers, devices and peripherals, and perform functions common to most drivers, including, for example, initialization and configuration, resource management, send/receive I/O transaction messages, direct memory access (DMA) transactions (e.g., read and write operations), queue management, memory registration, descriptor management, message flow control, and transient error handling and recovery. Such software driver modules may be written using high-level programming languages such as C, C++ and Visual Basic, and may be provided on a tangible medium, such as a memory device, magnetic disk (fixed, floppy, and removable), other magnetic media such as magnetic tapes; optical media such as CD-ROM disks, or via Internet download, which may be available to conveniently plug-in or download into an existing installed operating system (OS). One or more such software driver modules may also be bundled with the existing operating system which may be activated by a particular I/O device driver.

An I/O controller hub (ICH) 110 is connected to MCH 103 by bus 111. It operates to bridge or interface with a plurality of various I/O devices and peripherals. Several different types of I/O devices and peripherals controllers may be attached to ICH 110, such as a Peripheral Component Interconnect (PCI) bus 115 with a plurality of slots 116. PCI bus 115 may be a high performance 32 or 64 bit synchronous bus with automatic configurability and multiplexed address, control and data lines as described in the latest version of "*PCI Local Bus Specification, Revision* 2.2" set forth by the PCI Special Interest Group (SIG) on Dec. 18, 1998 for add-on arrangements (e.g., expansion cards) with new video, networking, or disk memory storage capabilities. Other types of bus architecture such as Industry Standard Architecture (ISA) and Expanded Industry Standard Architecture (EISA) buses may also be supported through a Moon PCI-ISA bridge 117.

A low pin count interface (LPC I/F) 120 of ICH 110 may support super I/O 121 for providing an interface with a plurality of I/O devices (not shown), including, for example, a keyboard controller for controlling operations of an alphanumeric keyboard, a cursor control device such as a mouse, track ball, touch pad, touch screen, joystick, digitizing tablet, a microphone, a mass storage device such as magnetic tapes, hard disk drives (HDD), and floppy disk drives (FDD), and serial and parallel ports to printers, scanners, and display devices. LPC I/F 120 may also support one or more firmware hubs 122, possibly over multiplexed connections, other application specific integrated circuit chips (ASICs) 123, and a management/security controller 124.

As shown in FIG. 1, ICH 110 may have a plurality of USB ports 125, which preferably collectively support both USB1 and USB2 protocols. ICH 110 may also support AC'97 Codec(s) 130 over an AC'97 2.1 bus, a local area network controller 135, GPIO 140, power management 145, including clock generators 146, system management (TCO) 150 and one or more SMBus device(s) over SMBus/I2C 155.

The exemplary, non-limiting, ICH 110 shown in FIG. I supports both a primary IDE and a secondary IDE. The bus may be a 16-bit bus. One skilled in the art will recognize that the bus may have more throughput, such as a 32-bit Peripheral Component Interconnect (PCI) bus. The bus may be a first channel having an ATA ribbon cable, one end connected to a storage device such as an IDE device, such as a master device, and the other connected to a second IDE device, such as a slave device. Each ribbon cable may be a 44/80 conductor cable or any suitable conductor cable. A secondary channel similar to bus 126 may be coupled to the controller so as to serve a second pair of master and slave devices.

Figure 2:
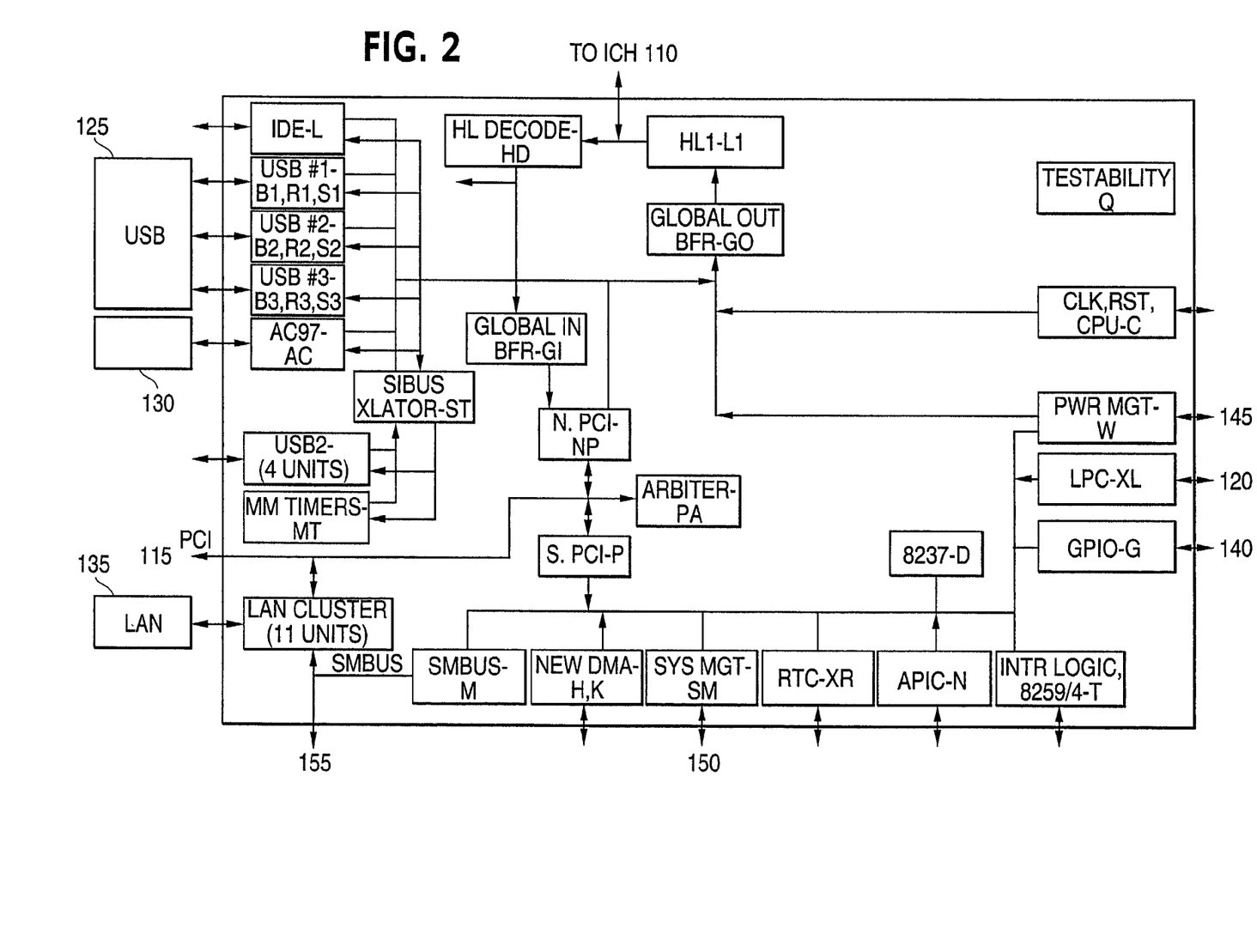

As shown in FIG. 2, ICH 110 contains a plurality of controllers for the supported devices connected thereto. Exemplary supported I/O devices and peripherals include keyboards, input mouses, printers, scanners, display devices, hard disk drives, Compact Disk Read Only Memory (CD-ROM) drives, Compact Disk Read/Write (CD-RW) drives, and other types of storage devices. These controllers act as a communications translator between the supported devices and processor subsystem 101. They may include logic that runs protocol instructions out onto the bus connecting ICH 110 to the device. One of these controllers is an IDE interface controller or a controller compatible (including being backward compatible) with the IDE interface. One of these devices is a storage device that may require translation of processor instructions and may employ information stored in a location that may be connected with desktop computer system 100. It may be a disk drive that may be adapted to read and write at least one rigid magnetic data storage disk (hard disk) that rotates about a central axle. Despite the particulars of this example embodiment of the invention involving data transfers between an IDE interface controller in ICH 110 and one or more IDE storage devices, the invention is not limited thereto and may be applied to data transfers between any type of controller and device connected to the controller.

Desktop computer system 100 may be configured differently, or employ some additional or different components, than as shown in FIG. 1. Although an ICH can be implemented by a variety of different components, an exemplary ICH is the Intel® 82801 BA I/O Controller Hub 2 (ICH2). Although ICH 110 includes example embodiments of the invention and thus differs from all known prior art components at least in that respect, it may be otherwise similar to a previously available ICH and a member of the family including one or more previously available ICHs, such as the Intel® 82801 BA I/O Controller Hub 2 (ICH2). In addition, in any particular personal computer implementation, ICH 110 may integrate many of the legacy and new standard I/O interfaces for that personal computer either presently existing or hereafter developed.

The method of making bit-granular writes to control registers according to the example embodiment of the invention is preferably applied specifically to the IDE controller of ICH 110. Software (preferably, a driver in the operating system software) running in processor subsystem accesses the IDE registers by running a transaction on the front side bus. The transaction is accepted and forwarded to ICH 110 by MCH 103. The transaction may be initially decoded by one block within ICH 110, and then forwarded to an IDE controller block within ICH 110. IDE accesses are forwarded to the IDE controller block (Assuming the IDE controller block is enabled for accesses) where further decoding is performed to determine the exact register bits to be accessed.

Register reads always result in a "completion packet" back to the processor. The read completion packet contains the data from the register. These are passed back up through the Global Out block (GO unit) and the Hub Link block (L1 unit). Writes to registers, which are the primary transactions of interest for this invention, may not require any completion information passed back to the processor. Writes to "I/O" or "Configuration" space require completion packets, while writes to "Memory" space do not require completion packets. Note that the terms "I/O", "Configuration" and "Memory" as used in these paragrapghs only refer to a characteristic specified in the transaction that determines how the address should be decoded.

IDE can be programmed to initiate Direct Memory Accesses (DMA). DMA cycles are "memory" reads and writes that are sent up the hub link interface to the MCH, snooped in the processor's caches, and targeted to system DRAM. Once again, IDE-initiated reads to DRAM will result in subsequent read completion packets to be delivered to the ICH over the hub link interface.

As more fully developed below, the IDE controller in ICH 110 in the example embodiments of the invention may be adapted to handle initialization completion notification, unlike conventional I/O data transfer techniques which employ a CPU to handle initialization completion notification, so that the time the CPU dedicates to initializing an IDE device may be reduced. Specifically, the IDE controller allows software (including a driver in operating system software executed in processor subsystem 101) to write specific bits of a register while leaving other bits within the same byte unchanged. This is achieved by providing a "Bit Enable" field composed of a number of bits equal to the number of bits in the register. When writing to the register, the software specifies exactly which bits are to be overwritten by placing a "1" in the corresponding bit of the bit enable field.

Figure 4:
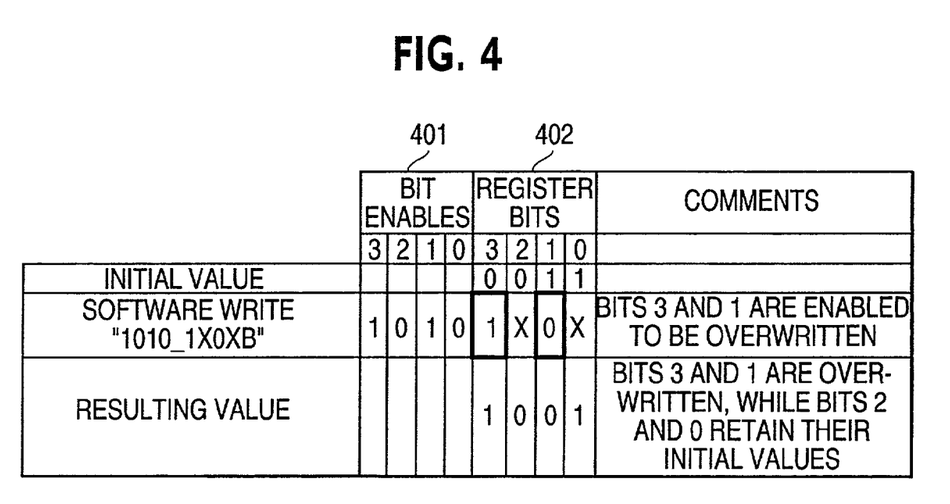
FIG. 4 is a table illustrating an example in which individual bits in a control register are overwritten.
Figure 5:
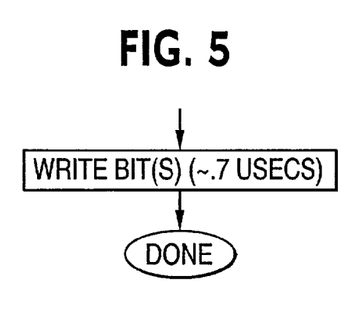
FIG. 5 illustrates a method of writing individual bits to a control register according to an example embodiment of the invention.

FIG. 4 illustrates an example in which bit location 3 of a register must be set to "1" and bit location 1 must be cleared to "0". In this example, the software provides for an 8-bit value having a "1" in the bit locations of bit enable field 401 that correspond to bit locations 3 and 1 of the register and a "0" in the bit locations of bit enable field 401 that correspond to bit locations 2 and 0 of the register. This enables bit locations 3 and 1 of the register to be overwritten. It also provides a "1" in the bit locations of data field 402 that correspond to bit locations 2 and 0 of the register. (Any value may be provided at the bit locations of data field 402 that correspond to bit locations 2 and 0 of the register.) In the example shown in FIG. 4, the bit locations of bit enable field 401 and data field 402 are in the same position as the bit locations of the register.

Hardware associated with the register receives a data packet containing the bit enable field and the data field ("1010.sub.--1.times." binary in the example of FIG. 4) and overwrites the bit locations of the register for which the enable bit in the corresponding location of the bit enable field is set. The other bit locations of the register are left unchanged. In the example shown in FIG. 4, bit locations 3 and 1 of the register are overwritten with the data in the corresponding bit locations of data field 402, while bit locations 2 and 0 of the register retain their initial values.

Generally speaking (without reference to the example shown in FIG. 3), the bit enable field allows any combination of N register bits to be over-written with a 2*N-bit write command with relatively simple hardware implementation. The invention can be easily applied to existing hardware structures having existing control registers by providing an alternate register location for implementing the "bit-granular writes" as described above. In the case of an I/O Controller Hub (ICH) or other suitable hardware device, the alternate register location may be placed in memory space, thereby allowing the processor to post the bit-granular writes for use with the streamlined technique described below.

In the example embodiments of the invention described herein, the methods are utilized with either one of, or both of, IDE DMA status register and IDE command register. In particular, the methods are used when initiating a DMA sequence for an IDE storage device.

To cause an IDE storage device or other external I/O device or peripheral to perform I/O data transfer operations, the host processor initializes it so as to prepare it to receive I/O data transfer operation commands. To initialize the IDE storage device or other external I/O device or peripheral, the host processor transmits one or more task-file initialization commands to it as a data packet through what is called the task-file register set. Each task-file initialization takes a significant length of time to execute. One reason for this is that each command execution is verified by the host processor before the next command may be executed.

Transmitting information to an IDE device may involve several individual actions (or "writes") to the task-file register set, each of which conventionally may be processed in a 1.2 μs I/O cycle. For example, where seven individual initialization actions are processed by an IDE interface controller, the total I/O cycle time may be 8.4 μs (=7×1.2). The collective of these seven writes may be thought of as a task-file. The action of the CPU in performing a series of commands or I/O accesses to properly enable an IDE device for the transfer of data may be referred to as "writing the task file."

During the time in which the IDE interface controller device sends a task-file I/O, the processor is blocked from generating further commands or receiving further requests. Under current ATA standards, the processor would be tied up for 8.4 μs on sending a command to an IDE device with seven individual I/O task-file writes. To put this wait into perspective, a 1 Ghz processor may execute about 1,000 ordinary instructions in one microsecond. Thus, in the 8.4 μs a processor dedicates to IDE device initialization, up to 8,400 ordinary instructions (=1,000×8.4) could be processed by the processor if a time a processor dedicates to IDE device command setup is reduced.

By employing a shadow register space to handle task-file I/O completion, the present invention works toward reducing the time a processor may dedicate to command setup of an IDE device by approximately 7.0 μs ; from 8.4 μs to approximately 1.4 μs. Moreover, the invention similarly may be employed towards reducing the time a processor may dedicate to the operation of devices internal and external to a processor. Therefore, in a "fill condition," i.e. when a task-file register is written and a processor must wait until the I/O cycle out to the IDE device is completed, the register space allows the extension in the IDE interface controller that is described in this invention to complete the I/O cycle to the IDE device. Thus allowing the processor to return to processing other tasks, such as task-file writes.

An addressing method is used to uniquely identify the source and destination of a data transfer in desktop computer system 100 in a meaningful manner. Each device, such as a memory integrated circuit, storage device, or processor, may have its own local address space. An address space may be the range of addresses that a processor or process can access, or at which a device can be accessed.

The address space of a device bus may be dependent upon at least the width of the address; that is, the number of bits in the address. A device bus having an address width of 16 bits uniquely identifies $2^{16}$ or exactly 65,536 locations. The size of a processor's address space depends on the width of the processor's address bus and address registers. Each local address space may start at zero. Each local address may be mapped to a range of addresses which starts at some base address in the processor's address space. Similarly, each process will have its own address space, which may be all or a part of the processor's address space.

Preferably, the initialization can be streamlined so that processor subsystem 101 can post an entire command sequence for setting up an I/O data transfer operation with an external I/O device or peripheral to the control registers in a controller for the external I/O device or peripheral. The ICH 110 preferably implements a streamlining command setup feature that allows an IDE driver in the operating system executed by processor subsystem 101 to perform task file commands for a typical disk access using posted memory writes, instead of I/O writes. This allows CPU 104 in processor subsystem 101 to quickly complete the IDE set up and move on to other operations.

Figure 3:
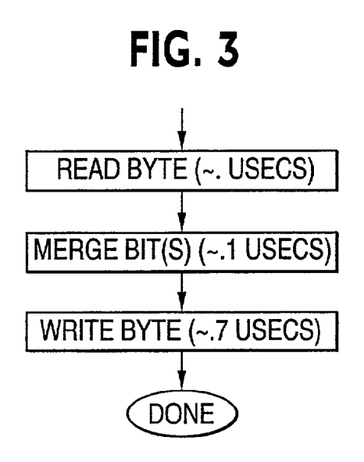
FIG. 3 illustrates a prior art method of changing individual bits in a control register.

In a conventional I/O-based method, the CPU spends an average of greater than 1.2 microseconds per access that runs to the IDE drive as shown in FIG. 3. Although the IDE 1/0 accesses are used to initiate all disk accesses regardless of IDE mode (i.e. PIO, DMA, UDMA), this streamlining feature must only be used for UDMA transfers. This allows the driver software to off-load CPU 104 in processor subsystem 101 earlier to perform other activities while waiting for the interrupt upon the completion of the transfer.

With six PIO command accesses and two read-modify-write accesses to the Bus Master I/O registers, CPU 104 is stalled for approximately 8 microseconds at the beginning of any disk access while performing this sequence. Based on 8 posted memory writes (on a 133 MHz front-side bus) described below and used to replace the current I/O cycles, the expected stall for the processor the time for a conventional I/O process is 7.91 microseconds versus a time of only 0.18 microseconds for the streamlining process. The result is a 98% decrease in time duration for an actual savings of 7.73 microseconds. The improvement is less impressive if the Fast NonData PIO mode can be used with the drives on the IDE interface.

Figure 6:
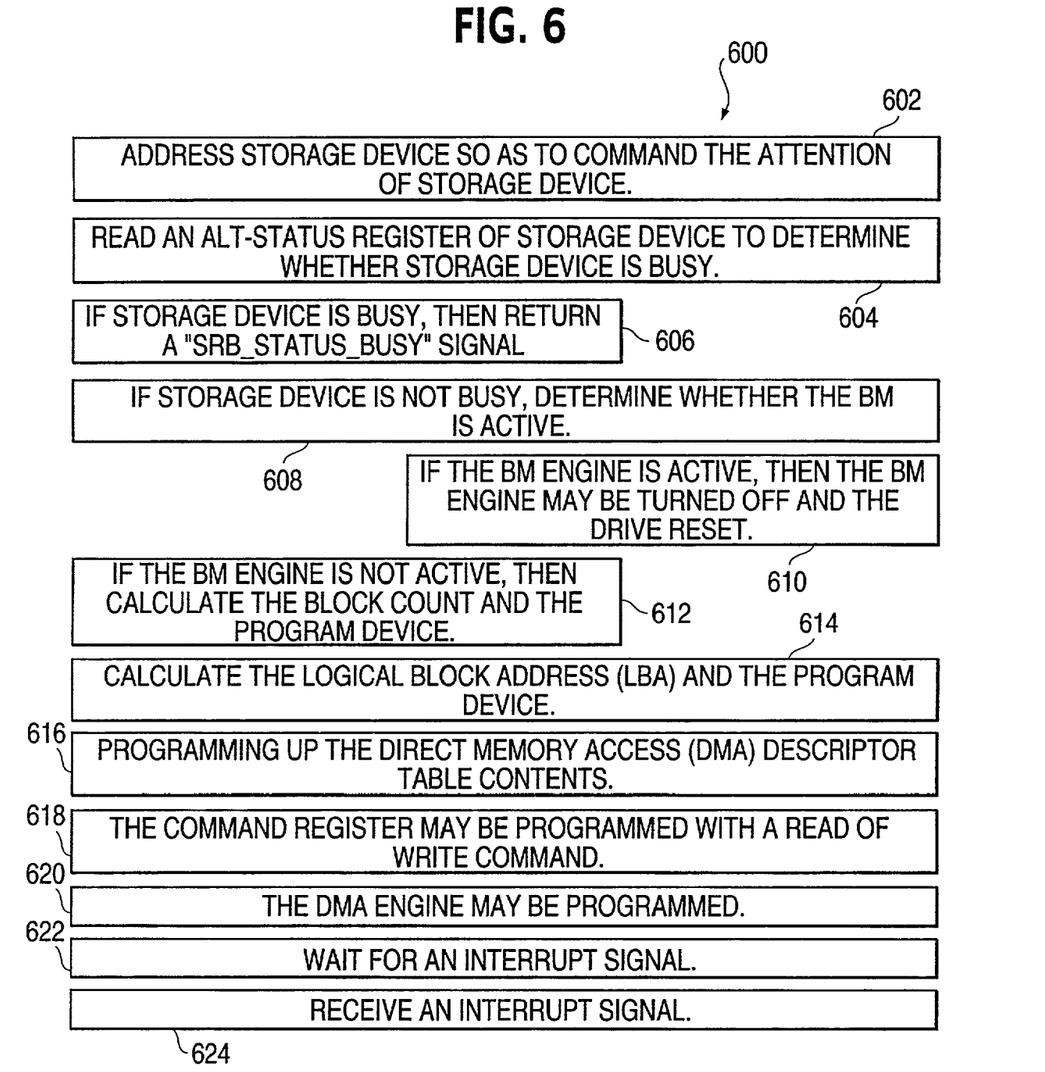
FIG. 6 illustrates a read/write command setup protocol method which may be used in conjunction with a method of writing individual bits to a control register according to an example embodiment of the invention.
Figure 7:
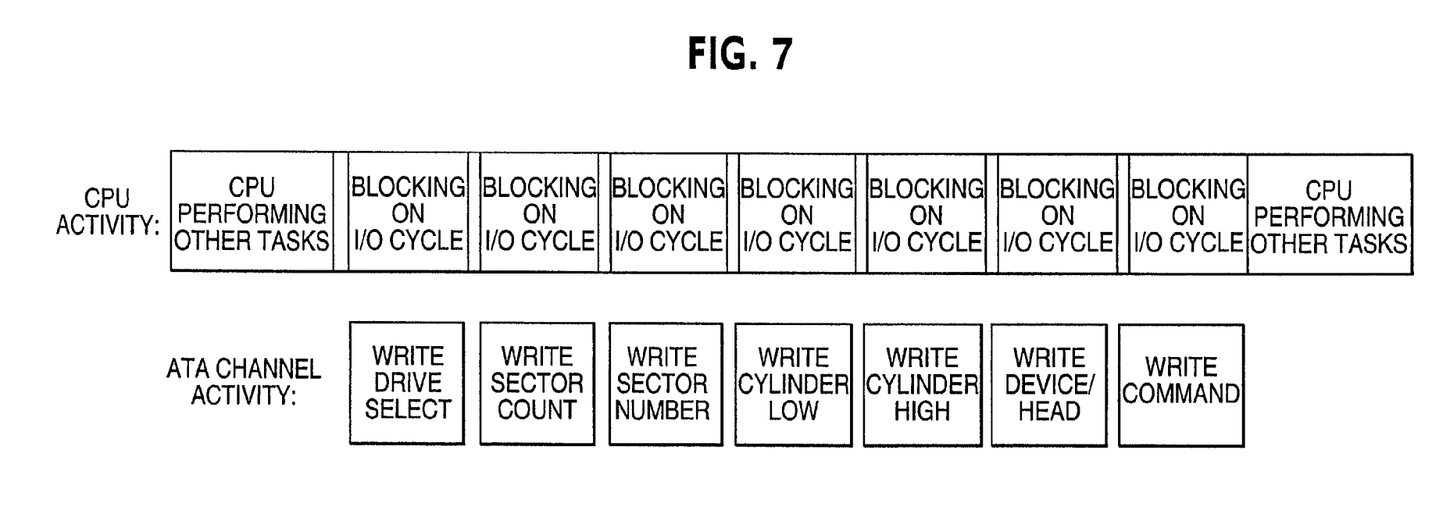
FIG. 7 illustrates a conventional input/output (I/O) task-file access.

FIG. 6 illustrates a read/write streamlined command setup method 600. FIG. 7 illustrates a timeline of the method of FIG. 6. As is readily seen, in FIG. 7, while the ATA channel is in an active state, such as writing drive select, the CPU 104 is blocked from performing other tasks.

Method 600 may include similarities to conventional protocols used to write a task-file. However, it differs at least insofar as it involves writing to a memory mapped register queue rather than I/O mapped task-file registers.

Method 600 may be implemented in software recorded in any readable medium which, when executed, causes computer 100, preferably processor subsystem 101, to perform method 600. In one embodiment, method 600 may be implemented through a distributed readable storage medium containing executable computer program instructions which, when executed, cause at least one of a client computer system and a server computer system to perform method 600. Additionally, method 600 may be implemented though a computer readable storage medium containing executable computer program instructions which, when executed, cause a computer system 100 to perform method 600.

Method 600 may begin at step 602. At step 602, method 600 may address the storage device so as to command the attention of the storage device. Bit four of the device/head register field indicates the selected device (DEV). Thus, step 602 may include placing the proper input at bit four (the write/drive select bit) of the device/head register field. This bit four information is always sent to the I/O task-file.

At step 604, method 600 may read an alt-status register of the storage device to determine whether the storage device is busy. If it is busy, then method 600 may return a "SRB_STATUS_BUSY" signal at step 506 since the small computer system interface (SCSI) request block (SRB) field would not be clear. From step 606, method 600 may return to step 604.

Under normal operations, the storage device may not be busy at the first reading of its alt-status register. Thus, the read command of step 604 may be sent to the I/O task-file. Alternatively, method 600 may return to step 604 up to 20,000 times. Here, the read command of step 604 may be sent to the memory queue.

If the storage device is not busy, then method 600 may continue to step 608. At step 608, method 600 may determine whether the DMA engine of the storage device is active. If the BM engine of the storage device is active, then the BM engine may be turned off and the drive reset at step 610. If the BM engine of the storage device is not active, then method 600 may proceed to step 612.

At step 512, method 600 may calculate the block count and the program device. This may involve writing the block length to the memory queue of the sector count register field. Step 612 is distinguished from conventional techniques in that, under conventional techniques, the block length is written to an I/O task-file whereas step 612 includes writing the block length to the memory queue.

At step 614, method 600 may calculate the logical block address (LBA) and the program device. This may include at least one of writing the following registers to the memory queue: sector number, cylinder low, cylinder high, and device/head register. Step 614 is distinguished from conventional techniques in that, under conventional techniques, these registers are written to an I/O task-file whereas step 514 includes writing the registers to the memory queue.

Preferably, ICH 110 implements a Command Posting FIFO for each IDE channel. PIO write commands are posted to the FIFO by writing to the memory location specified in the IDE Command Posting Range, below. The commands are then executed in order on the respective interface. The depths of the FIFOs may be provided to software through the Primary and Secondary Posting FIFO Depth Registers. Software must use this information to guarantee that the FIFO's do not overflow. The depth of each of the FIFO's may be fixed to a maximum (i.e., 8) entries. One possible sequence of writes is:

1. Sector Count Register (02*h*)
2. Sector Number (03*h*)
3. Cylinder Low (04*h*)
4. Cylinder High (05*h*)
5. Device/Head (06*h*)
6. Command (07*h*)
7. Bus Master Status Register Interrupt Cleared
8. Bus Master Start/Stop bit is set, and the Read/Write bit is written simultaneously.

These are preferably the last 8 writes in the command sequence. As described above, software must select the ATA device prior to this specific sequence.

At step 616, method 600 may include programming the DMA descriptor table contents. At step 618, the command register may be programmed with a read or write command that may be sent to the memory queue rather than an I/O task-file.

At step 620, the BM engine may be programmed. This may involve clearing the BM interrupt (BMI) status bit for a specifically-accessed controller, such as a controller in ICH 110. Additionally, the drive transfer protocol (DTP) of the BM engine may be set. In one embodiment, the BMI_DTP register may be set only once. Last, the BMI control may be set to a "Start/Stop Bus Master" bit.

With the BM engine programmed at step 620, method 600 may wait for an interrupt signal from the storage device at step 622. This may involve returning a "SRB_STATUS_PENDING" signal since the small computer system interface (SCSI) request block (SRB) field would be connected with change. At step 624, an interrupt signal may be received.

The invention may be employed whenever a direct memory access read or write is initiated to an ATA device. Since typical computer systems include a primary hard disk drive that may be enabled for accesses through a direct memory access read or write, CPU performance may improve with each use of this invention. In turn, as CPU performance improves, the disk access overhead that this invention works towards reducing will equate to an ever-large performance gain.

Figure 8:
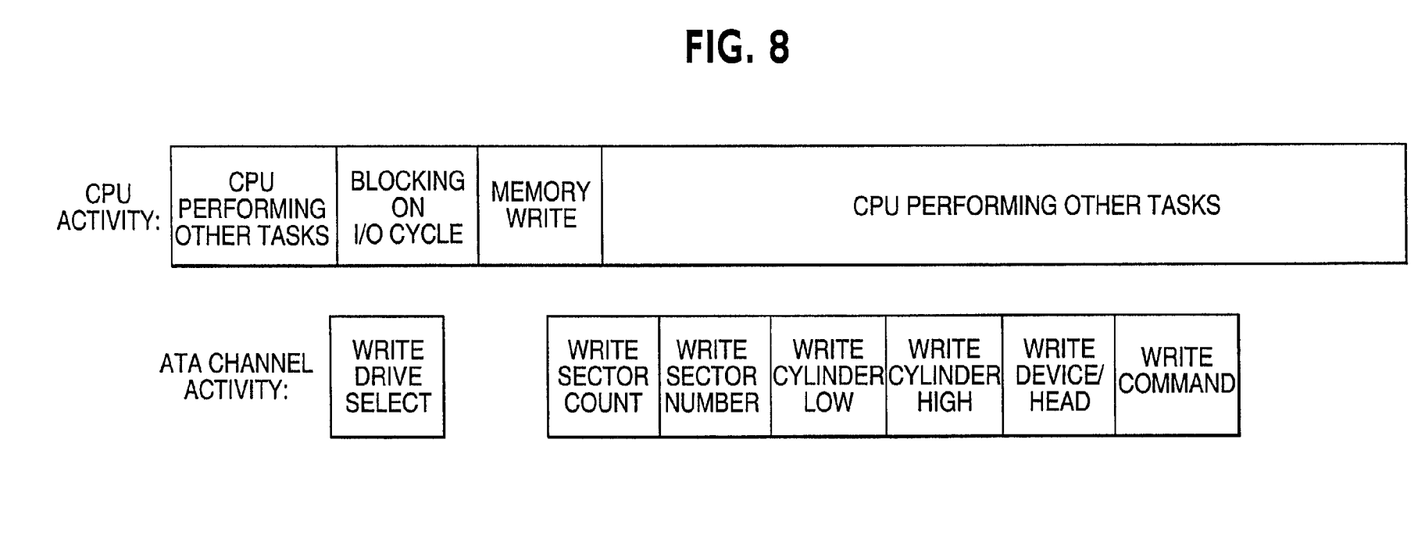
FIG. 8 illustrates a streamlining task-file access which may be used in conjunction with a method of writing individual bits to a control register according to an example embodiment of the invention.

FIG. 8 illustrates a timeline for a method of the invention wherein task-file access is streamlined. By using this example embodiment of the invention, the CPU is freed up to allow processing of other tasks.

The above embodiment can also be stored on a device or medium and read by a machine to perform instructions. The device or medium may include a solid state memory device and/or a rotating magnetic or optical disk. The device or medium may be distributed when partitions of instructions have been separated into different machines, such as across an interconnection of computers.

While the foregoing and following written and illustrated disclosure focuses on describing example embodiments of the invention, it should be understood that the same is by way of illustration and example only, is not to be taken by way of limitation, should not be construed as limiting the scope of the subject matter of the claimed invention, and may be modified in learned practice of the invention. The specification and drawings are, accordingly, to be regarded in an illustrative rather than a restrictive sense. Moreover, the principles of the invention may be applied to achieve the advantages described herein and to achieve other advantages or to satisfy other objectives, as well. While the foregoing has described what are considered to be example embodiments of the invention, it is understood that various modifications may be made therein and that the invention may be implemented in various forms and embodiments, and that it may be applied in numerous applications, only some of which have been described herein. It is intended by the following claims to claim all such modifications and variations.

The invention claimed is:

1. A computer comprising:
a processor subsystem;
a device which transfers data to or from said processor subsystem; and
a controller connected between said device and said processor subsystem and adapted to control the transfer of data between said device and said processor subsystem, said controller executing a method comprising,
receiving a data value of a write directed to a control register in the controller,
interpreting bits of the data value as a data field, the number of bits in the data field being equal to the number of bits in the control register in the controller and bit locations in the data field corresponding respectively to bit locations in the control register;
interpreting bits of the data value as enable bits in a bit enable field, the number of enable bits in the bit enable field being equal to the number of bits in the control register and bit locations in the bit enable field corresponding respectively to bit locations in the control register; and
overwriting only the bits at the bit locations of the control register for which the enable bit in the corresponding location in the bit enable field is set with the bit in the corresponding location in the data field, wherein the processor subsystem is to post an entire command sequence in the controller for setting up an IDE (integrated drive electronics) data transfer.

2. The computer recited in claim 1, further comprising a bridge between the processor subsystem and at least said device, the controller being included in the bridge.

3. The computer recited in claim 2, wherein the device comprises an IDE (integrated drive electronics) storage device and the bridge comprises an I/O controller hub (ICH) which controls an IDE data transfer between the processor subsystem and the IDE storage device.

4. A software program stored in a tangible medium, said program, when executed, causing a computer to execute a method of writing individual bits of data to a register, said method comprising:
issuing a write of a data value to the register,
overwriting only bits at bit locations of the register for which a corresponding enable bit in the data value is set with corresponding data bits in the data value, wherein the computer is to post an entire command sequence in a controller for setting up an IDE (integrated drive electronics) data transfer.

5. The software program recited in claim 4, wherein said software program comprises a driver in the operating system software executed by a processor subsystem in the computer.

6. The software program recited in claim 5, wherein the register is a control register in the controller adapted to control an IDE (integrated drive electronics) data transfer operation between said processor subsystem and an IDE storage device.

7. The software program recited in claim 5, wherein the processor subsystem posts an entire command sequence for setting up the IDE (integrated drive electronics) data transfer to a controller.

8. The method of claim 4 wherein the data value comprises N enable bits and N data bits that correspond to N bits of the register.

9. The method of claim 4 wherein the register has a location in configuration space and a location in memory space, and
issuing a write of a data value to the register comprises issuing the write to the location in memory space for the register.

10. A method comprising
receiving data of a single write command wherein the data comprises a bit enable field and a data field comprising N bits in each field,
updating a register with one or more bits of the data field that are associated with enabled bits of the bit enable field, and
posting an entire command sequence in a controller for setting up an IDE (integrated drive electronics) data transfer.

11. The method of claim 10 wherein
the data of the single write command comprises 2*N bits,
the bit enable field comprises N bits, and
the data field comprises N bits.

12. The method of claim 10 wherein the register has a location in configuration space and a location in memory space, further comprising
issuing the single write command of the data to the location in memory space for the register.

13. The method of claim 10 wherein
the register has a location in I/O space and a location in memory space, and
a processor subsystem issues a write of the data value to the location in memory space for the register.

14. The method recited in claim 10, wherein the register is a control register for a data transfer operation.

15. The method recited in claim 14, wherein the data transfer operation transfers data to or from a storage device.

16. The method recited in claim 15, wherein the control register is a command register.

17. The method recited in claim 10, wherein some of the bits of said register are not overwritten.

18. The method recited in claim 10, wherein the data field and the bit enable field are received simultaneously.

19. The method recited in claim 18, wherein the data field is provided at an address which is contiguous with the address for the bit enable field.

20. The method recited in claim 10, wherein the data transfer operation comprises a data transfer between a processor subsystem and an external storage device or peripheral.

21. The method recited in claim 20, wherein the processor subsystem posts an entire command sequence for setting up the data transfer.

22. The method recited in claim 20, wherein the method is carried out in a controller in a bridge connected between the processor subsystem and the external storage device or peripheral.

* * * * *